United States Patent [19]

Sugaya et al.

[11] 3,900,892

[45] Aug. 19, 1975

[54] MAGNETIC VIDEO RECORDING AND REPRODUCING APPARATUS

[75] Inventors: Hiroshi Sugaya, Suita; Hiroo Hosono, Osaka, both of Japan

[73] Assignee: Matsushita Electric Industrial Co., Ltd., Osaka, Japan

[22] Filed: Jan. 29, 1974

[21] Appl. No.: 437,629

Related U.S. Application Data

[63] Continuation of Ser. No. 189,902, Oct. 18, 1971, abandoned.

[30] Foreign Application Priority Data

Oct. 19, 1970 Japan .............................. 45-92525
Oct. 27, 1970 Japan .............................. 45-94851
Dec. 18, 1970 Japan .............................. 45-116067
Dec. 29, 1970 Japan .............................. 45-124710

[52] U.S. Cl. .................... 360/85; 245/195; 360/83; 360/130

[51] Int. Cl.[2] .................... G11B 15/66; G11B 15/26

[58] Field of Search ........... 360/85, 95, 130, 84, 83; 242/192, 195, 198, 76, 78.8; 226/91, 92

[56] References Cited

UNITED STATES PATENTS 3,150,840 9/1964 Briskin et al. .......................... 242/195
3,208,682 9/1965 Pastor et al. .......................... 360/95
3,375,331 3/1968 Okazaki et al. .......................... 360/84
3,539,084 11/1970 Bradshaw .......................... 226/91
3,598,926 8/1971 Umeda .......................... 360/85

*Primary Examiner*—Alfred H. Eddleman
*Attorney, Agent, or Firm*—Stevens, Davis, Miller & Mosher

[57] ABSTRACT

A magnetic video recording and reproducing apparatus wherein a magnetic tape being fed from the supply reel is transported while being wound in the form of a helix on the periphery of a cylindrical tape guide containing a single rotary head and the magnetic tape is helically scanned by means of the rotary head whereby the recording and reproducing operation is performed, wherein there is provided a leader tape guide having a groove-like opening portion formed in one side face which has a wider width than the magnetic tape, the leader tape guide being wound in the form of a helix over the periphery of the tape guide with the opening portion thereof disposed in opposing relationship to the rotary head with a predetermined spacing maintained between the adjacent wound portions of the leader tape guide, and wherein the magnetic tape has a rigid leader tape secured to the forward end thereof which is wider than the opening portion.

5 Claims, 8 Drawing Figures

MAGNETIC VIDEO RECORDING AND REPRODUCING APPARATUS

This invention relates to a rotary head type magnetic video recording and reproducing apparatus, and more particularly to such apparatus of the single-head, helical scanning type wherein the magnetic tape is automatically loaded.

In the helical scanning, rotary head type magnetic video recording and reproducing apparatus, the rotary head is contained in the cylindrical tape guide in such a way that the tip of the head is made to project out of the side surface of the tape guide, and the magnetic tape is transported in contact with the rotary head while being wound on the periphery of the cylindrical tape guide, thereby performing the recording and reproducing operation. In an attempt to effect the automatic loading of the magnetic tape, it is required that the magnetic tape be wound onto the tape guide. Especially in the case of the single-head type, the magnetic tape should be wound on the tape guide over an angular range of 360° in the form of a helix. Therefore, great difficulty has heretofore been encountered in attempting to effect automatic tape loading.

It is an object of this invention to provide a rotary head type magnetic video recording and reproducing apparatus of the single-head, helical scanning system wherein there is provided a mechanism for automatically winding the magnetic tape from a take-up reel onto the periphery of a cylindrical tape guide containing a rotary head over an angular range of approximately 360° in the form of a helix along the path of rotation of the rotary head, thereby making possible the automatic loading of the magnetic tape.

In accordance with this invention, a leader tape guide provided in one side face thereof with a groove-like opening portin having a wider width than that of the magnetic tape is provided in such a manner as to be wound over the periphery of the tape guide containing the rotary head with a predetermined spacing maintained therebetween, with the opening portion disposed in facing relationship to the rotary head. Furthermore, a leader tape of a moderate rigidity which is wider than the opening portion of the leader tape guide is fixed to the forward end of the magnetic tape. During the tape loading operation, the lead tape is first unwound by means of the reel drive, brought to the leader tape guide, then transported around the tape guide once, subsequently passed through a tape drive mechanism including a capstan and pinch roller and thus wound onto a take-up reel. The magnetic tape succeeding the leader tape is permitted to escape from the leader tape guide because of the fact that the width of the magnetic tape is narrower than that of the opening portion, so that it is wound onto the periphery of the tape guide so as to be ready to be transported. In this way, the tape loading operation is completed. As will be appreciated from the foregoing, there is no danger that the rotary head will be damaged by the leader tape, by virtue of the fact that the latter never contacts the rotary head.

In the aforementioned mechanism, however, since the width of the magnetic tape is narrower than that of the leader tape, when the magnetic tape is transported toward the axis of the tape guide at an angle similar to that in the case of the leader tape, a gap is formed between the edges of the tape at such a position that the incoming portion of the magnetic tape and outgoing portion thereof become parallel to each other. Therefore, if the magnetic tape is scanned by the single rotary head, then the magnetic track will be interrupted so that signal drop-out portions will inevitably occur.

Another object of this invention is to eliminate the drawback mentioned just above, that is, to dispose the edges of the magnetic tape into contact with each other, with little or no gap therebetween, in the position where the incoming and outgoing portions of the magnetic tape on the tape guide are moved in parallel with each other, thereby preventing the magnetic track formed by the rotary head from being interrupted.

To this end, the axis of the tape guide is inclined with respect to the center axis of the wound leader tape guide so that the magnetic tape can be wound onto the tape guide at a appropriate angle.

However, attempting to achieve the second object with the aid of the arrangement described just above will inevitably cause the passage for the magnetic tape to be changed. In the automatic tape loading mechanism such as the one according to the present invention, the magnetic tape is permitted to escape from the leader tape guide to be wound onto the tape guide and thus transported; it is required that the leader tape and magnetic tape follow the same path at least at the opposite end portions of the leader tape guide. In those portions, the magnetic tape is also made to pass through the leader tape guide. Thus, there occur two processes: the process in which the magnetic tape is made to escape from the leader tape guide and the process in which the magnetic tape is made to enter the leader tape guide. Therefore, owing to the fact that there is the difference between the position where the magnetic tape is wound onto the tape guide and the position where the leader tape guide is wound over the tape guide, there is a possibility that the edges of the magnetic tape contact the edges of the opening portion so that the magnetic tape is damaged thereby.

A further object of the present invention is to eliminate such a possibility. To this end, the opposite end portions of the leader tape guide are made substantially arcuate with the opening portion directed toward the inside, and the radii of curvature of the upper and lower edges of the leader tape guide are made different from each other so that the level of the center line of the leader tape guide and that of the center line of the magnetic tape during the transportation of the magnetic tape are substantially in register with each other at the opposite end portions of the leader tape guide.

A still further object of the present invention is to construct the apparatus according to the first object in such a manner that the magnetic tape can be placed in good contact with the eraser head and audio control signal head and yet these heads are prevented from being damaged by the rigid leader tape when the magnetic tape is automatically loaded. To this end, in accordance with the present invention, the eraser head and audio control head are disposed at positions corresponding to the opposite ends of the leader tape guide in opposing relationship to the opening portion of the leader tape guide respectively. With such an arrangement, the magnetic tape is brought into good engagement with the aforementioned two heads after escaping from the opening portion of the leader tape guide, whereas the leader tape is prevented from contacting these heads because it is moved in the leader tape guide, so that there is no possibility that these heads are damaged by the leader tape.

Other objects, features and advantages of the present invention will become apparent from the following description taken in conjunction with the accompanying drawings, in which.

Figure 1:
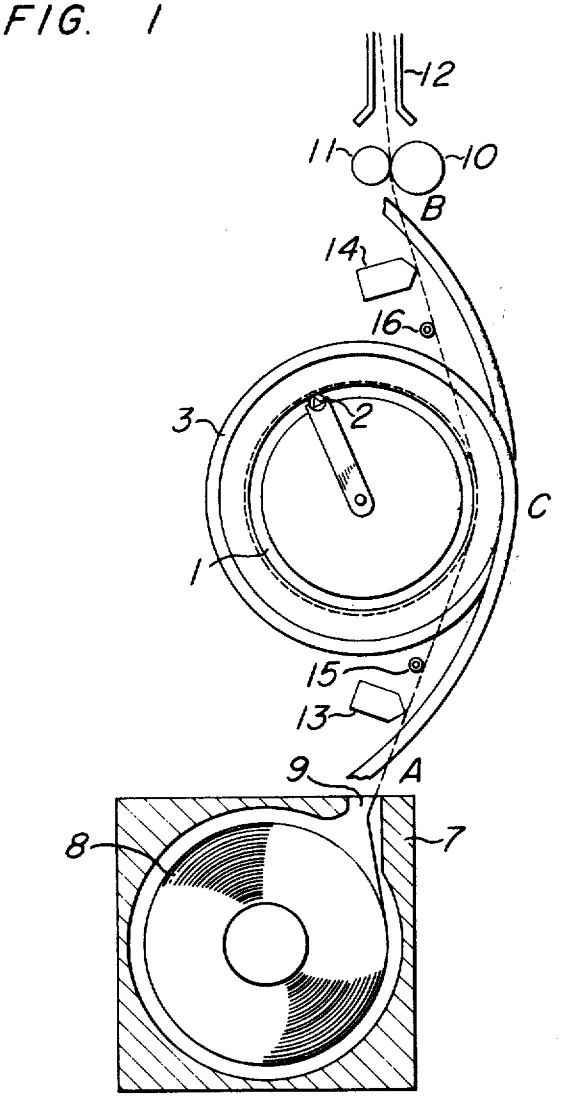
FIG. 1 is a schematic view showing the main portion of the magnetic video recording and reproducing apparatus according to an embodiment of the present invention.
Figure 2:
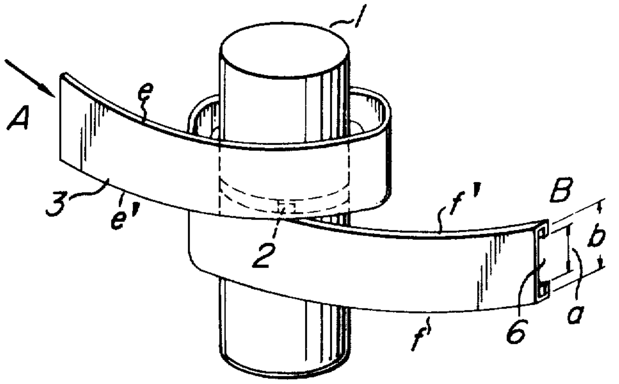
FIG. 2 is a perspective view showing the main portion of the apparatus shown in FIG. 1.

In the drawings, numeral 1 represents a cylindrical tape guide containing a single rotary head 2 and which has a leader tape guide 3, the construction of which will be described later, wound over the outer periphery thereof over an angular range of 360° substantially in conformity to the tape transporting path which is established during the operation of the apparatus, with a predetermined spacing maintained between the adjacent wound portions of the leader tape guide.

Leader tape 4 has a width *b* wider than the width *a* of the magnetic tape 5, and it is formed by a Mylar tape or the like which is thick and rigid. The leader tape 4 is fixed to the forward end of the magnetic tape 5.

Figure 3:
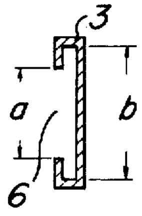
FIG. 3 is a sectional view showing a leader tape guide provided in the aforementioned apparatus.
Figure 4:
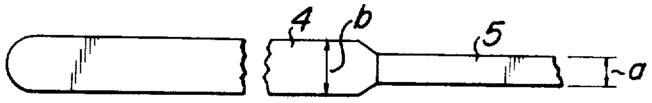
FIG. 4 is a side view showing a magnetic tape for use with the apparatus described above and a leader tape fixed to the forward end of the magnetic tape.

The leader tape guide 3 has an opening portion 6 at one side which is wider than the width *a* of the magnetic tape 5 but narrower than the width *b* of the leader tape 4, as shown in FIG. 3. This opening portion 6 is disposed facing the tape guide.

Numeral 7 indicates a tape cassette containing a single tape reel 8, which is detachably mounted in the magnetic video recording and reproducing apparatus. The tape cassette 7 is designed so that when it is mounted in the magnetic video recording and reproducing apparatus, tape inlet-outlet port 9 thereof is located in register with one of the ends of the leader tape guide 3, as shown in FIG. 1.

Provided in the vicinity of the other end portion of the leader tape guide 3 is a tape driving mechanism consisting of a pinch roller 10 and capstan 11.

With the arrangement described above, by mounting the tape cassette 7 in position and thereafter rotating the tape reel 8 provided in the tape cassette 7 in the tape rewinding direction, the leader tape 4 is taken out of the tape inlet-outlet port 9, continuously transported because of its rigidity so as to be passed through the leader tape guide 3 and then taken out of the opposite end of the leader tape guide 3.

The leader tape 4 which has now been taken out of the leader tape guide 3 is permitted to pass between the capstan 11 and the pinch roller 10 by virtue of its rigidity (the pinch roller 10 is not in tight contact with the capstan 11 when the tape is loaded) and then guided into a tape guiding member 12 so as to be wound onto a take-up reel (not shown) by any conventional means.

With the foregoing condition established, the pinch roller 10 is pressed against the capstan 11 to transport the leader tape 4, and thus the magnetic tape 5 succeeding the leader tape 4 is guided into the leader tape guide 3.

Due to the fact that the leader tape guide 3 is provided with the opening portion 6 which is wider than the magnetic tape 5 as described above, however, only the magnetic tape 5 is permitted to escape from the opening portion 6 by virtue of tension applied thereto, so that the magnetic tape is wound onto the tape guide 1 over an angular range of 360° as shown by the dotted line in FIG. 1. In this way, the apparatus is made ready for effecting the recording or reproducing operation.

The design is made such that even under the condition that the magnetic tape 5 has escaped from the leader tape guide 3, part of the magnetic tape 5 is still located in the leader tape guide 3 at the opposite ends thereof.

Numerals 13 and 14 denote an eraser head and audio control head respectively, these heads being disposed in opposing relationship to the opening portion 6 of the leader tape guide 3. The heads 13 and 14 are brought into contact with the magnetic tape immediately before and after the rotary head contacts the magnetic tape, respectively.

Numerals 15 and 16 represent guide pins provided at the opposite sides of the tape guide 1 and which are adapted to guide the magnetic tape 5 which has escaped from the leader tape guide 3 toward the tape guide 1 in the predetermined positional relationship.

In an attempt to rewind the tape, the reel 8 is reversely rotated so that the magnetic tape 5 is wound taking the path shown by the dotted line until the leader tape 4 arrives at the end B of the leader tape guide 3, after the leader tape has been wound on the reel 8 having passed through the leader tape guide 3.

Figure 5:
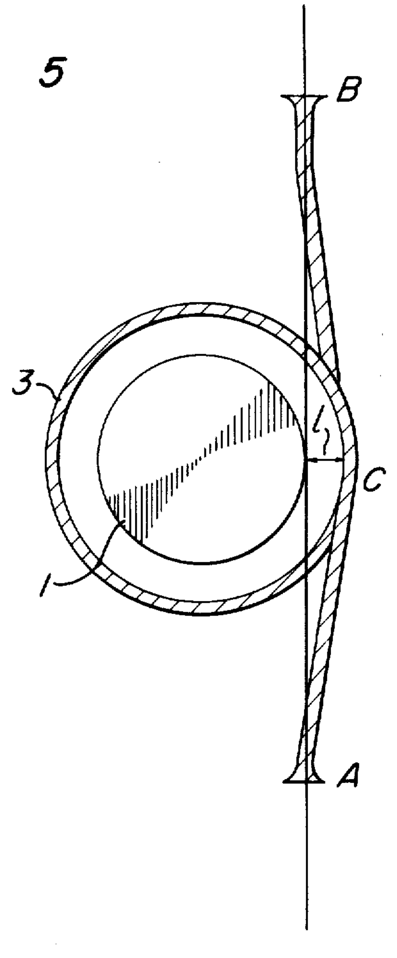
FIG. 5 is a view showing a preferred example of the end portion of the leader tape guide provided in the aforementioned apparatus.

In order that the leader tape 4 is permitted to be smoothly introduced into the leader tape guide 3 during the rewinding operation, it is required that the angle at which the leader tape 4 enters the leader tape guide 3 be made sufficiently acute. To this end, the design may be made such that the forward end of the leader tape 4 is moved along the passage which the tape takes during the recording-reproducing operation, as shown in FIG. 5.

Figure 6:
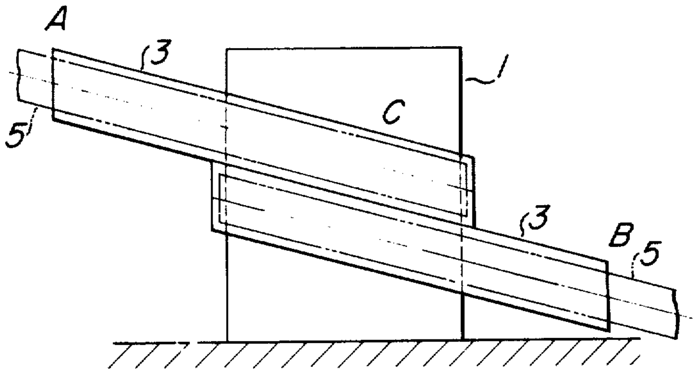
FIGS. 6 and 7 are side views showing the manner in which a magnetic tape is wound onto the tape guide of an apparatus which is not provided with the tape guide improved according to this invention.
Figure 7:
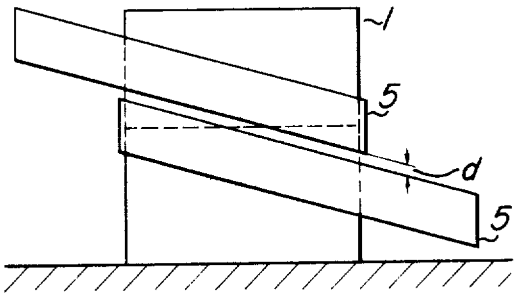

With the aforementioned arrangement, it is possible to record a signal on the magnetic tape and reproduce the signal therefrom. In actuality, however, due to the fact that the width of the magnetic tape is smaller than that of the leader tape, a gap as shown at d will inevitably occur between the upper and lower portions of the magnetic tape 5 which is disengaged from the tape guide 3 through the opening portion 6, as shown in FIGS. 6 and 7, so that the signal corresponding to the gap *d* will be dropped out.

Therefore, it is required that the gap d be substantially eliminated immediately after the tape 5 has been wound on the tape guide 1.

Figure 8:
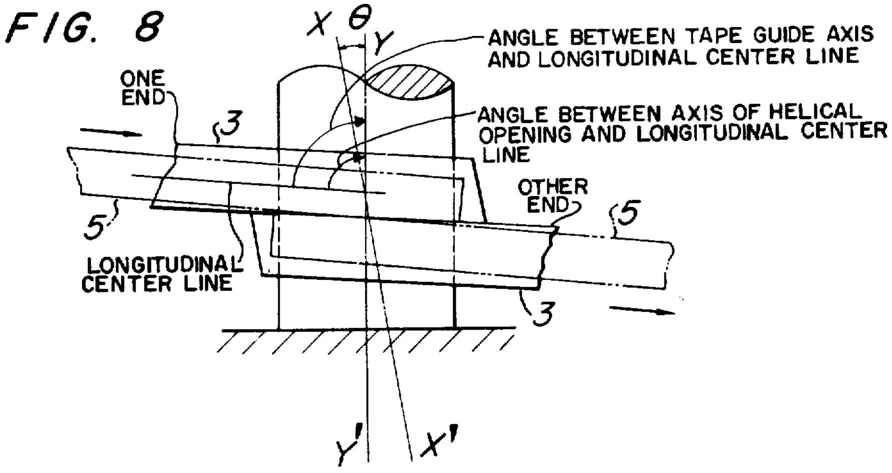
FIG. 8 is a side view showing the manner in which the magnetic tape is wound onto the improved tape guide according to this invention.

To this end, the center axis Y—Y' of the tape guide 1 is inclined with respect to the center axis X—X' of the tape guide 3 in the direction that the tape 5 goes out, so that the gap *d* may be substantially eliminated while the tape is being transported, as shown in FIG. 8.

With such an arrangement, however, the center axis of the magnetic tape during the recording or reproducing operation will naturally be out of register with the center axis of the leader tape guide 3 on the tape guide 1, so that the magnetic tape escaping from or entering into the leader tape guide 3 through the opening portion thereof will be disposed in contact with the edge of the opening portion.

In order to avoid the difficulty mentioned just above, the leader tape guide is so constructed that the section for guiding the tape to a position in the vicinity of the tape guide (section between A and C in FIG. 1) and the section for releasing the tape from the tape guide (the section between C and B in FIG. 1) become arcuate with a slight curvature, and the radii of curvature of the upper edge *e* of the section between A and C and lower edge *f* of the section between C and B becomes smaller than the radii of curvature of the lower edge *e'* of the section between A and C and upper edge *f'* of the section between C and B, thus achieving the registration of the center axis of the magnetic tape being transported during the recording or reproducing operation with the center axis of the leader tape guide at the opposite ends of the leader tape guide.

In this way, undesirable contact between the leader tape guide and the magnetic tape which otherwise tends to occur during the recording or reproducing operation can be eliminated so that smooth transportation of the magnetic tape can be achieved.

In the embodiment described above, the tape guide 1 is inclined in the manner described above since the leader tape guide 3 is wound with respect to the tape guide 1 so that the magnetic tape 5 is passed therethrough from above to below. In the case where the tape guide is wound in the opposite direction, the inclination of the tape guide 1 may be reversed. This is also true of the radius of curvature of the end portions of the leader tape guide 3.

As will be appreciated from the foregoing, according to the present invention, automatic tape loading can effectively be achieved with respect to single-head type magnetic video recording and reproducing apparatus with which difficulty has heretofore been encountered in tape loading.

Although in the foregoing embodiment the rotary head was rotated along a slit formed in the tape guide, it will be apparent to those skilled in the art that it is also possible that one of the tape guide drums may be made rotatable with the head secured thereto or that the entire tape guide may be made rotatable with the head secured thereto.

What we claim is:

1. A magnetic video recording and reproducing apparatus comprising:

a cylindrical tape guide bearing a single rotary head;

a leader tape attached to the forward end of a magnetic tape, the rigidity and width of said leader tape being greater than the rigidity and width of the magnetic tape;

an elongated leader tape guide, having a longitudinal opening portion, wound over an angular range of 360° of the outer periphery of said cylindrical tape guide substantially in a helical form with said opening portion facing said tape guide;

tape transport means for introducing said leader tape into one end of said leader tape guide, the axis of said cylindrical tape guide being inclined with respect to the axis of the helix of said helical opening portion in such a manner that the angle between the axis of said inclined cylindrical tape guide and the longitudinal center line of a portion of said leader tape guide including said one end of said leader tape guide into which said magnetic tape is introduced in a forward winding operation is larger than the angle between the axis of the helix of said helical opening and said longitudinal center line thereby to ensure closed winding of the magnetic tape on said tape guide over an angular range of 360° for continuous recording on the so wound magnetic tape by said single magnetic head, said magnetic tape being transported on said tape guide along a passage in a form similar to said helical form of said tape guide; and means for taking up said leader tape and magnetic tape from the other end of said leader tape guide.

2. A magnetic video recording and reproducing apparatus according to claim 1, wherein the magnetic tape is introduced and transported at least in the take-up means side end portion of said leader tape guide during the recording and reproducing operation.

3. A magnetic video recording and reproducing apparatus according to claim 1, wherein the opposite end portions of said leader tape guide are made substantially arcuate with a slight curvature, with the opening portion thereof facing the inside, and the radii of curvature of the lower edge of the leader tape guide on the supply side and upper edge of the leader tape guide on the take-up side are made different from those of the upper edge thereof on the supply side and lower edge thereof on the take-up side.

4. A magnetic video recording and reproducing apparatus according to claim 1, wherein an eraser head and an audio control signal head are provided facing the opening portion of said leader tape guide.

5. A magnetic video recording and reproducing apparatus comprising: a cylindrical tape guide bearing a single rotary head; a leader tape attached to the forward end of a magnetic tape, the rigidity and the width of said leader tape being greater than those of the magnetic tape; an elongated leader tape guide having a longitudinal opening portion wound over an angular range of 360 degrees of the outer periphery of said cylindrical tape guide substantially in a helical form with said opening portion facing said tape guide; tape transport means for introducing said leader tape into one end of said leader tape guide; and means for taking up said leader tape and magnetic tape from the other end of said leader tape guide; wherein the axis of said cylindrical tape guide is inclined with respect to the axis of the helix of said helical opening portion in such a manner that the acute angle between the axis of said inclined cylindrical tape guide and the longitudinal center line of a portion of said leader tape guide including said one end of said leader tape guide into which said magnetic tape is introduced in a forward winding operation is larger than the acute angle between the axis of the helix of said helical opening portion and said longitudinal center line thereby to ensure closed helical winding of the magnetic tape on said cylindrical tape guide over an angular range of 360 degrees for continuous oblique recording on and reproduction from the so wound magnetic tape by said single magnetic head, said magnetic tape being transported on said tape guide along the passage defined by the said closed helical winding similar to said helical form of said leader tape guide.

* * * * *